June 14, 1949.　　　　W. H. BASELT　　　　2,473,001
TRUSSED BRAKE BEAM
Filed March 24, 1944　　　　　　　　3 Sheets-Sheet 1
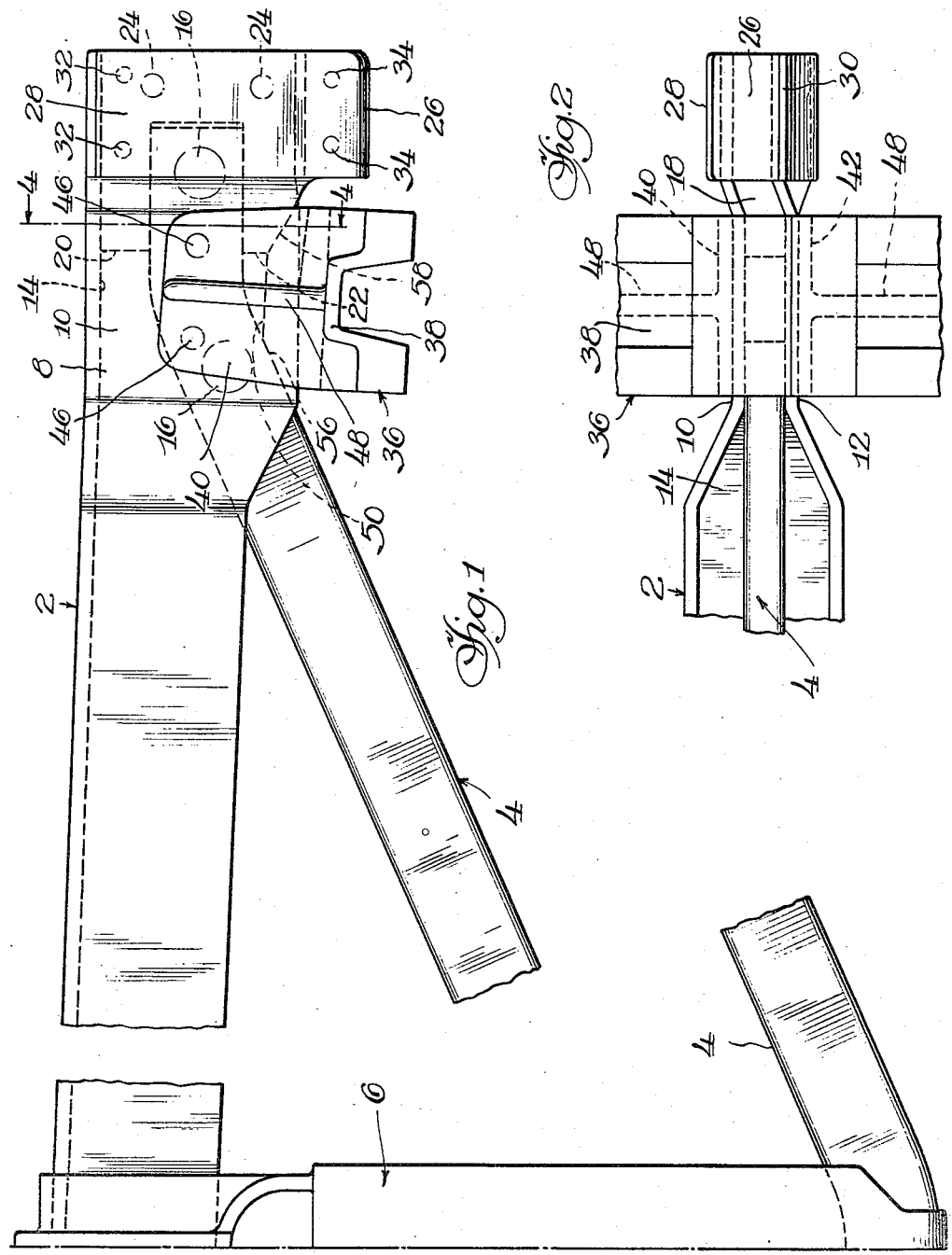
INVENTOR.
Walter H. Baselt
BY
Atty.

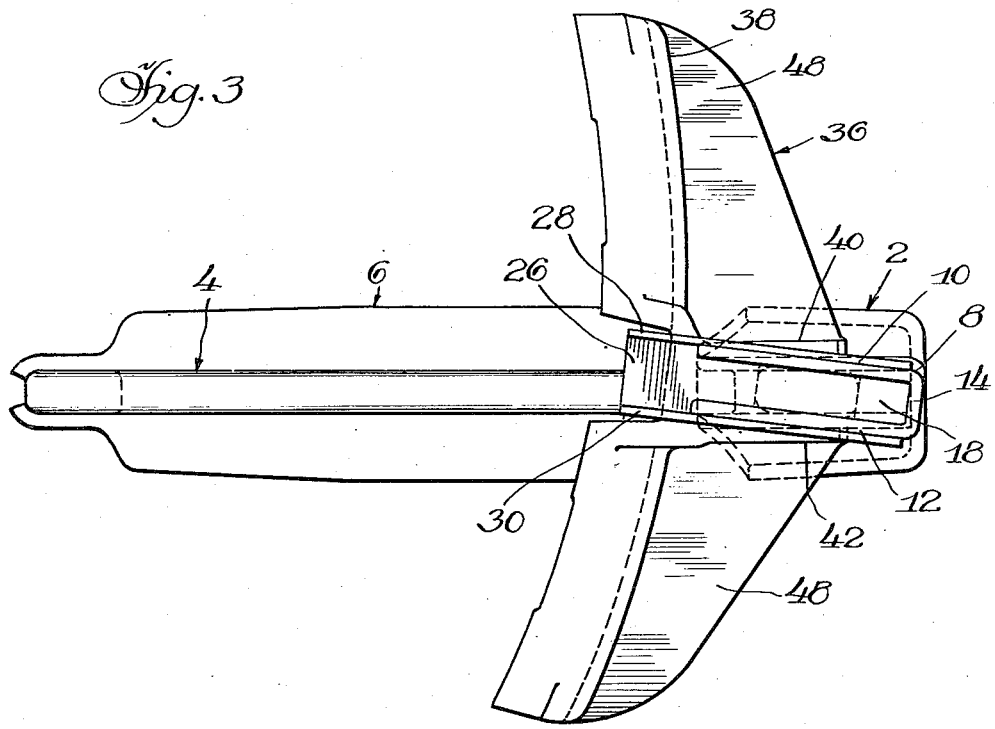
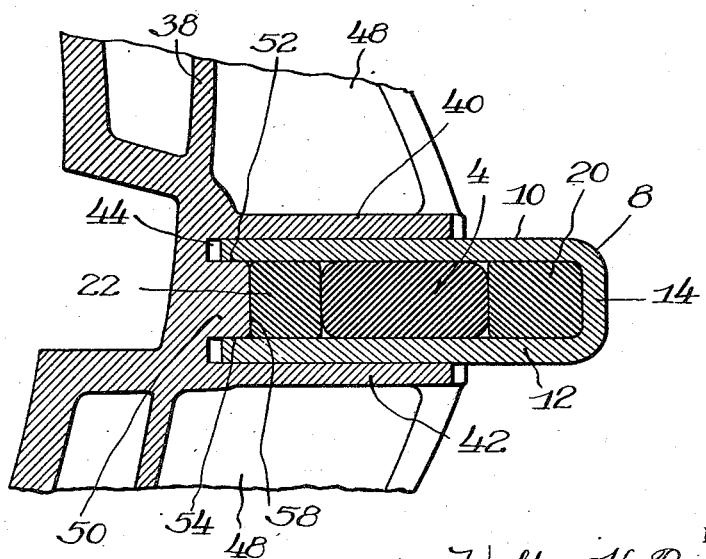

June 14, 1949.    W. H. BASELT    2,473,001
TRUSSED BRAKE BEAM
Filed March 24, 1944    3 Sheets-Sheet 3
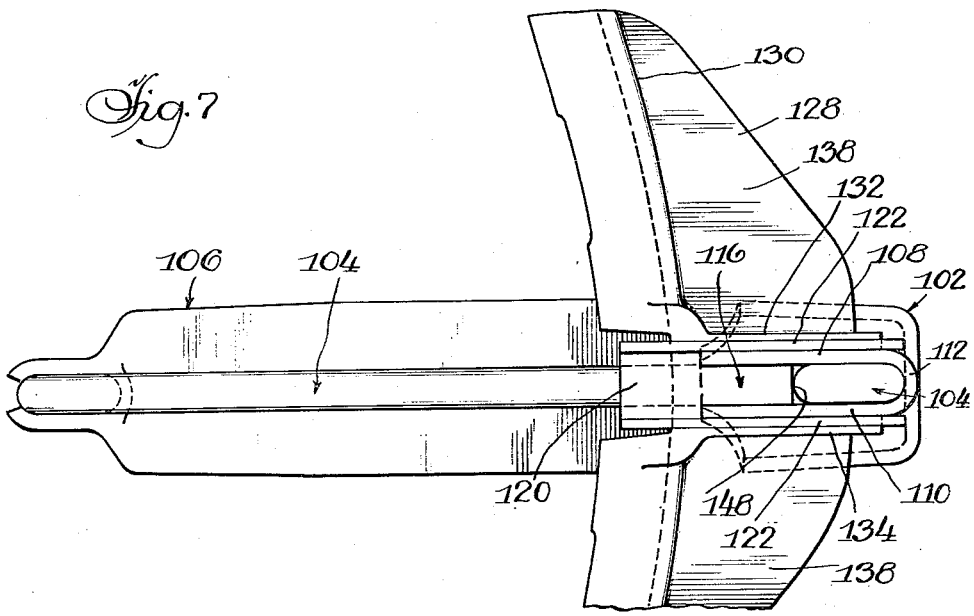
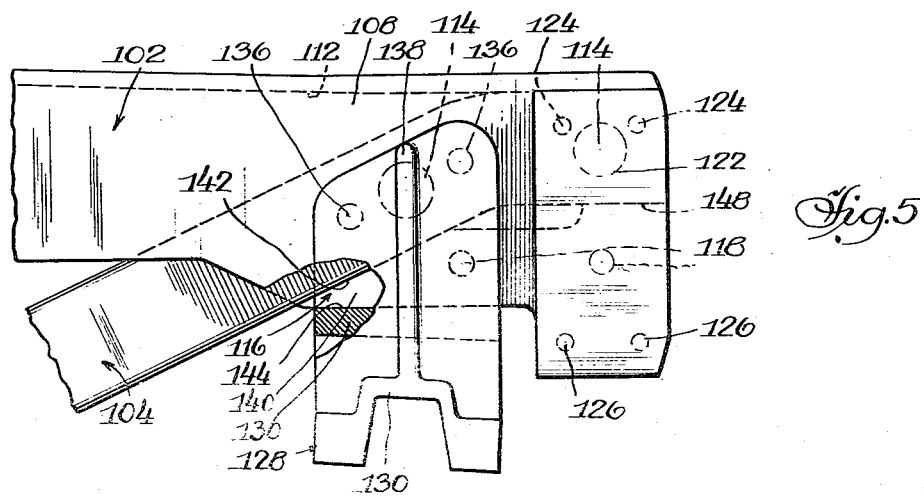
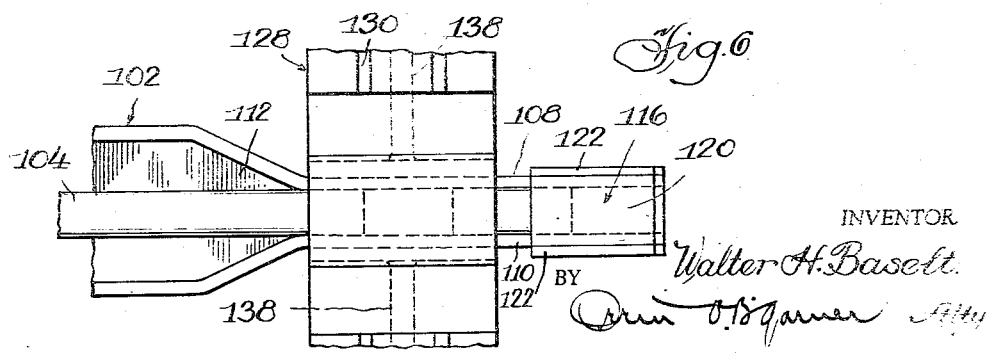

Patented June 14, 1949

2,473,001

UNITED STATES PATENT OFFICE 2,473,001

TRUSSED BRAKE BEAM

Walter H. Baselt, Chicago, Ill., assignor to American Steel Foundries, Chicago, Ill., a corporation of New Jersey Application March 24, 1944, Serial No. 527,898

21 Claims. (Cl. 188—223.1)

My invention relates to a novel design of making a truss type brake beam suitable for use in railway brake rigging and more particularly to a so-called "unit" type beam which comprises guide means on the extremities thereof for slidable engagement with guide brackets on the supporting railway car truck.

The general object of my invention is to design a brake beam of the above described type which may be economically manufactured and which is capable of withstanding stresses developed under service conditions.

A specific object of my invention is to provide filler blocks received between and welded to the spaced webs of the U-section compression member at each end of the beam to reinforce the guide portions thereof, said blocks bearing against the tension member and the associated brake heads to increase the rigidity of the beam.

Another object of my invention is to afford projections on the filler blocks extending forwardly of the compression member webs to afford seats for wear plates which are welded to said projections and to said compression member outwardly of the brake heads, thus affording guide means as above described for slidable engagement with support means on the truck structure.

Still another object of my invention is to provide novel end portions on the beam inclined with respect to the plane thereof, whereby the beam may slide on said end portions toward and away from an associated wheel in a plane approximately radial thereto while, at the same time, the beam proper may be disposed substantially in the plane in which the actuating forces are transmitted thereto by an associated brake lever. It will be understood that by means of this arrangement undesirable bending forces on the beam are eliminated.

In the drawings,

Figure 1 is a fragmentary top plan view of the preferred embodiment of my novel brake beam with a portion thereof broken away, only one end thereof being illustrated inasmuch as it is symmetrical about its transverse center line.

Figure 2 is a fragmentary front elevation of the structure shown in Figure 1, and Figure 3 is a side elevation.

Figure 4 is a fragmentary sectional view taken in the transverse vertical plane indicated by the line 4—4 of figure 1.

Figures 5 to 7 inclusive illustrate a modification of my invention, Figure 5 being a fragmentary top plan view comparable to Figure 1 with a portion of the structure broken away to clarify the illustration, Figure 6 being a fragmentary front elevation of the structure shown in Figure 5, and Figure 7 being an end elevation thereof.

Describing my invention in detail and referring first to the embodiment thereof illustrated in Figures 1 through 4, my novel brake beam comprises a compression member generally designated 2, a tension member generally designated 4, and a strut generally designated 6 and connected therebetween in conventional manner, said strut affording a fulcrum for an associated brake lever (not shown) as will be clearly understood by those skilled in the art.

At each end thereof the compression member is bent to form a relatively thin end portion 8 with spaced top and bottom webs 10 and 12 and a rear wall 14. Each end of the tension member 4 is snugly fitted between the associated top and bottom webs 10 and 12 and is spot welded thereto as at 16, 16 (Figure 1). A filler block 18 is also snugly fitted between said webs, said block comprising the spaced legs or tongues 20 and 22 embracing the end of the tension member 4, the tongue 20 bearing against the rear wall 14, and the tongue 22 bearing against the associated brake head, as hereinafter described, to afford a particularly rigid structure.

The filler block is spot welded to the webs 10 and 12 as at 24, 24 (Figure 1), and said block comprises a projection 26 extending forwardly of said webs to increase the guide area of the beam. The projection 26 comprises top and bottom surfaces substantially co-planar with the top and bottom surfaces of the webs 10 and 12 respectively to afford seats for the top and bottom wear plates 28 and 30, each of said plates being spot welded as at 32, 32 (Figure 1) to the associated compression member web 10 or 12 and as at 34, 34 to the projection 26 of the filler block; and it will be readily understood by those skilled in the art that the wear plates 28 and 30 afford suitable surfaces on which the beam may slide in the associated truck bracket (not shown) to and from the associated wheel (not shown).

The brake head generally designated 36 comprises a front wall 38 formed and arranged for the connection thereto in conventional manner of a brake shoe (not shown) and merging with said front wall intermediate the upper and lower extremities thereof are the spaced top and bottom walls 40 and 42 defining therebetween a brake beam recess or cavity 44 for the reception of the top and bottom webs 10 and 12 of the compression member, the walls 40 and 42 being spot welded to the respective webs of the compression member as at 46, 46 (Figure 1); and each of said walls is reinforced by a substantially vertical rib 48 on the brake head.

A lug 50 is formed on the brake head within the recess 44, the top of said lug presenting a substantially flat surface bearing against the web 10 of the compression member as at 52, and the bottom of said lug presenting a substantially flat surface bearing against the web 12 as at 54, and the lug is provided at opposite ends thereof with converging faces bearing as at 56 and 58 respectively against complementary surfaces of the tension member 4 and the leg 22 of the filler block 18.

It will be understood that the engagement of the lug 50 with the various elements of the beam, as above described, and the engagement of the leg 20 of the filler block with the rear wall 14 of the compression member combine to afford a particularly rigid structure capable of withstanding the extreme stresses which are developed in a beam of this type under service conditions.

It may be noted that the tension and compression members and the filler block 18 are twisted outwardly of the brake head in such manner that the top and bottom surfaces of the wear plates 28 and 30 are disposed in planes inclined at an angle of approximately 7° with respect to the horizontal plane of the brake beam proper, whereby the beam is particularly adapted to accommodate the horizontal braking forces applied in customary manner to the strut 6, and at the same time, is adapted to slide in a radial plane to and from an associated wheel in guide brackets provided for that purpose on the associated truck structure.

In fabricating the above described embodiment of my novel brake beam, each end of the tension member is inserted between the top and bottom webs 10 and 12 of the associated end portion 8 of the compression member and is spot welded thereto as at 16, 16. The filler block is then inserted to its proper position and is spot welded to the webs 10 and 12, as at 24, 24, and thereafter the block and the ends of the tension and compression members are twisted to the desired angle. The brake head 36 and wear plates 28 and 30 are then spot welded to their supporting structure, the head being welded as at 46, 46 to the top and bottom webs 10 and 12 and the wear plates being welded to said webs as at 32, 32 and to the projection 26 of the filler block as at 34, 34. It will be understood that the brake head and wear plates are welded to the beam without regard to sequence.

Referring now to the embodiment of my invention illustrated in Figures 5 through 7 inclusive, the brake beam comprises the compression member generally designated 102, the tension member generally designated 104, and the strut generally designated 106 (Figure 7) connected therebetween in conventional manner and affording a fulcrum for an associated brake lever (not shown), as will be clearly apparent to those skilled in the art.

The compression member is bent at each end thereof into a relatively thin end portion comprising the top and bottom webs 108 and 110 and the arcuate rear wall 112 extending therebetween, and the tension member 104 extends at each end thereof between the webs 108 and 110 of the associated end portion and is spot welded to said webs as at 114, 114 (Figure 5). A filler block generally designated 116 is snugly fitted between the webs 108 and 110 and is welded thereto as at 118 (Figure 5), said block having a projection 120 extending forwardly of said webs and affording top and bottom surfaces substantially co-planar with the top and bottom surfaces of the webs 108 and 110 respectively to afford seats for the top and bottom wear plates 122, 122 which are spot welded at 124, 124 (Figure 5) to said webs and are spot welded at 126, 126 to said extension 120 of the filler block 116.

The brake head generally designated 128 comprises a front wall 130 formed and arranged for connection in conventional manner to an associated brake shoe (not shown), and said head comprises the top and bottom walls 132 and 134 projecting rearwardly from the web 130 and defining therebetween a brake beam cavity within which the end portion of the compression member is snugly fitted, said top and bottom walls 132 and 134 being spot welded as at 136, 136 to the top and bottom webs 108 and 110 respectively of the compression member end portion. The walls 132 and 134 are reinforced by the substantially vertical identical ribs 138, 138.

It may be noted that the filler block 116 is provided with a leg or tongue 140 having a diagonal face in abutment as at 142 with the tension member 104 and a face approximately parallel to the longitudinal axis of the beam in abutment as at 144 with a complementary surface on the wall 130 of the brake head. The filler block 116 also bears against the tension member as at 148 outwardly of the brake head 128. It will be understood that by abutment of the filler block 116 with the various elements of the beam as above described, a particularly rigid structure is obtained as in the previously described embodiment.

In fabricating the beam illustrated in Figures 5 through 7, the tension member 104 is inserted between the top and bottom webs 108 and 110 and is spot welded thereto as at 114, 114. The filler block 116 is then fitted between the webs 108 and 110 in abutment with the tension member as at 142 and 148 and is spot welded to said webs as at 118, 118. Thereafter, the brake head 128 and the wear plates 122, 122 are welded into position without regard to sequence, the brake head being spot welded to the webs 108 and 110 as at 136, 136, and the wear plates being spot welded to said webs as at 124, 124 and being spot welded to the filler block as at 126, 126.

It will be apparent that in each of the illustrated embodiments of my invention, any suitable type of brake head may be utilized, the design shown being but one of the many types capable of use in my novel beam.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a truss type brake beam, a U-section compression member comprising spaced top and bottom webs and an intervening rear wall, a tension member welded at each end thereof to the corresponding end of said compression member intermediate the spaced webs thereof, a filler block welded to said compression member at each end thereof intermediate said spaced webs, said block extending forwardly of said webs and presenting top and bottom surfaces forwardly thereof and substantially co-planar with the top and bottom surfaces of the adjacent portions of said top and bottom webs respectively, wear plates welded to the top and bottom surfaces of said block and said adjacent portions of said webs, and a brake head secured to each end of said beam and spaced inwardly of the adjacent plates, each of said filler blocks having a portion extending between and bearing against adjacent surfaces of said tension member and the associated brake head aligned transversely of the beam, whereby rigidity of said brake beam is increased.

2. In a brake beam of truss type, a compression member having an end portion at each extremity thereof comprising spaced top and bottom webs and an intervening rear wall, a tension member having an extremity received between said webs and spot welded thereto, a filler block snugly fitted between said webs and spot welded thereto, said block having a projection extending forwardly of said webs, wear plate means welded to said webs and to the top and bottom surfaces of said projection, a brake head spaced inwardly of said projection and said means in the direction longitudinally of the beam, said brake head having top and bottom walls snugly fitted over said webs and spot welded thereto, and spaced legs on said block embracing the extremity of said tension member, one of said legs bearing against said rear wall and the other of said legs bearing against said brake head, said legs, said tension member, and said end portion being twisted outwardly of said head to afford a guide portion lying in a plane inclined with respect to the plane of said beam.

3. In a brake beam, a compression member having top and bottom webs and a rear wall, said compression member having a relatively thin end portion at each extremity thereof, a tension member welded at each end thereof to the corresponding end portion of said compression member intermediate said webs, a strut connected between said members intermediate the extremities thereof, a filler block welded to each end portion intermediate said webs, a brake head seated against said block and welded to the associated end portion, said block extending outwardly from said head in a direction longitudinally of the beam to the extremity of said compression member and having a portion extending forwardly of said spaced webs in a direction transversely of the beam at a point outwardly of said head, and wear plate means welded to said webs and the portion of said block extending outwardly therefrom.

4. In a brake beam of truss type, a compression member having an end portion at each extremity thereof comprising spaced top and bottom webs and an intervening rear wall, a tension member having an extremity received between said webs and spot welded thereto, a filler block snugly fitted between said webs and spot welded thereto, said block having a projection extending forwardly of said webs, wear plate means welded to said webs and to the top and bottom surfaces of said projection, a brake head spaced inwardly of said projection and said means in the direction longitudinally of the beam, said brake head having top and bottom walls snugly fitted over said webs and spot welded thereto, and a leg on said block extending between and bearing against said head and said tension member respectively at points disposed in alignment transversely of the beam.

5. In a brake beam of truss type, a compression member having an end portion at each extremity thereof comprising spaced top and bottom webs and an intervening rear wall, a tension member having an extremity received between said webs and spot welded thereto, a filler block snugly fitted between said webs and spot welded thereto, said block having a projection extending forwardly of said webs, wear plate means welded to said webs and to the top and bottom surfaces of said projection, a brake head spaced inwardly of said projection and said means in the direction longitudinally of the beam, said brake head having top and bottom walls snugly fitted over said webs and spot welded thereto, and spaced legs on said block embracing the extremity of said tension member, one of said legs bearing against said rear wall and the other of said legs bearing against said brake head.

6. In a brake beam, a compression member having top and bottom webs and a rear wall, said compression member having a relatively thin end portion at each extremity thereof, a tension member welded at each end thereof to the corresponding end portion of said compression member intermediate said webs, a filler block welded to each end portion intermediate said webs, a brake head bearing against said block and welded to the associated end portion, said block extending outwardly from said head to the extremity of said compression member and extending forwardly of said spaced webs at a point outwardly of said head, and wear plates spaced outwardly from said head and welded to said webs and the portion of said block extending forwardly therefrom, each block bearing against said tension member.

7. In a truss type brake beam, a U-section compression member comprising spaced top and bottom webs and an intervening rear wall, a tension member welded at each end thereof to the corresponding end of said compression member intermediate the spaced webs thereof, a filler block welded to said compression member at each end thereof intermediate said spaced webs, said block extending forwardly of said webs and presenting top and bottom surfaces forwardly thereof and substantially co-planar with the top and bottom surfaces of the adjacent portions of said top and bottom webs respectively, wear plates welded to the top and bottom surfaces of said block and said adjacent portions of said webs, and a brake head secured to each end of said beam and spaced inwardly of the adjacent plates.

8. In a truss type brake beam, a compression member comprising top and bottom webs and a rear wall, a tension member welded at each end thereof to the corresponding end of said compression member intermediate said webs, a strut connected between said members intermediate the ends thereof, a filler block at each end of the beam welded between said webs and projecting forwardly thereof, a wear plate welded to at least one of said webs and the portion of said block extending forwardly thereof, and a brake head carried by each end of the beam and spaced inwardly of the adjacent wear plate, each block comprising a leg extending between and bearing against transversely aligned surfaces on the associated head and an adjacent portion of said tension member respectively.

9. In a brake beam, a compression member having top and bottom webs and a rear wall, said compression member having a relatively thin end portion at each extremity thereof, a tension member welded at each end thereof to the corresponding end portion of said compression member intermediate said webs, a filler block welded to each end portion intermediate said webs, a brake head bearing against said block and welded to the associated end portion, said block extending outwardly from said head to the extremity of said compression member and extending forwardly of said spaced webs at a point outwardly of said head, and wear plates spaced outwardly from said head and welded to said webs and the portion of said block extending forwardly therefrom.

10. In a brake beam of truss type, a compression member having an end portion at each extremity thereof comprising spaced top and bottom webs and an intervening rear wall, a tension member having an extremity received between said webs and spot welded thereto, a filler block snugly fitted between said webs and spot welded thereto, said block having a projection extending forwardly of said webs, wear plate means welded to said webs and to the top and bottom surfaces of said projection, and a brake head spaced inwardly of said projection and said means in the direction longitudinally of the beam, said brake head having top and bottom walls snugly fitted over said webs and spot welded thereto.

11. In a truss type brake beam, a compression member comprising top and bottom webs and a rear wall, a tension member welded at each end thereof to the corresponding end of said compression member intermediate said webs, a strut connected between said members intermediate the ends thereof, a filler block at each end of the beam welded between said webs and projecting forwardly thereof, a wear plate welded to at least one of said webs and the portion of said block extending forwardly thereof, and a brake head carried by each end of the beam and spaced inwardly of the adjacent wear plate.

12. In a brake head, a front wall formed and arranged to support an associated brake shoe, spaced top and bottom walls projecting rearwardly from said front wall intermediate its extremities, said spaced walls defining a brake beam cavity therebetween, and a lug projecting from said wall between said webs and spaced therefrom, said lug presenting converging faces at opposite ends thereof for abutment respectively with elements of an associated brake beam, and said lug presenting substantially flat top and bottom surfaces for abutment with other elements of said beam.

13. In a brake head, a front wall formed and arranged to support an associated brake shoe, spaced top and bottom walls projecting rearwardly from said front wall intermediate its extremities, said spaced walls defining a brake beam cavity therebetween, and a lug projecting from said wall between said webs and spaced therefrom, said lug presenting converging faces at opposite ends thereof for abutment respectively with elements of an associated brake beam.

14. A brake beam structure comprising a truss including a compression member with spaced webs and a tension member projecting between said webs and secured thereto, a brake head secured to the truss inwardly of the extremity thereof, whereby said extremity affords support means for the beam, wear means secured to said extremity, and filler means secured between said webs in abutment along converging planes with said head and said tension member respectively.

15. A brake beam structure comprising a truss including a compression member with spaced webs and a tension member projecting between said webs and secured thereto, a brake head secured to the truss inwardly of the extremity thereof, whereby said extremity affords support means for the beam, wear means secured to said extremity, and filler means secured between said webs in abutment along converging planes with said head and said tension member respectively, said head being in abutment with a portion of said tension member.

16. In a brake beam, a compression member having an end portion including spaced webs and a rear wall, a brake head secured to said webs and presenting a plurality of surfaces converging toward said rear wall, a tension member secured between said webs and having a portion seated against one of said surfaces, and filler means between said webs seated against the other of said surfaces and another portion of said tension member.

17. In a brake beam, a compression member having an end portion including spaced webs, a tension member secured between said webs, a brake head having spaced walls overlying and connected to said webs, a lug on said head extending between said webs and with said walls snugly embracing said webs therebetween, said lug presenting converging faces at opposite ends thereof, and filler means between said lug and said tension member in abutment with a portion of said tension member and one of said faces, said tension member having another portion seated against the other of said faces.

18. A truss type brake beam including a compression member with spaced webs, a tension member secured between said webs, a brake head secured to said beam, and filler means between said head and said tension member in engagement with said tension member along a plane substantially parallel to the longitudinal vertical plane of said compression member, and in complementary engagement with said head along a plane angularly related to said first-mentioned plane.

19. A truss type brake beam including a compression member with spaced webs and a rear wall, a tension member secured between said webs, a brake head secured to the beam, and filler means snugly confined between said webs and secured thereto and in abutment with said rear wall and said tension member along substantially parallel planes and in abutment with said head along a plane angularly related to said planes.

20. A brake beam structure comprising a truss type beam including a compression member with spaced webs and a rear wall, a tension member secured between said webs in abutment with said rear wall, and filler means secured to said webs and in abutment with said tension member along converging planes and in abutment with said head along a plane substantialy parallel to the plane of said rear wall.

21. A brake beam comprising a truss structure including a compression member having spaced webs and a rear wall, a tension element and a filler element between said webs and secured thereto, a brake head secured to said webs, one of said elements abutting said rear wall along a plane substantially parallel to the axis of the beam, and at least one of said elements abutting said head along a plane angularly related to said first-named plane, said elements abutting each other along complementary surfaces.

WALTER H. BASELT.

REFERENCES CITED

The following references are of record in the file of this patent:

UNITED STATES PATENTS

| Number | Name | Date |
|---|---|---|
| 700,810 | Peckham | May 27, 1902 |
| 956,616 | Williams | May 3, 1910 |
| 1,303,435 | Whitney | May 13, 1919 |
| 2,094,035 | Ekholm | Sept. 28, 1937 |
| 2,170,121 | Busch | Aug. 22, 1939 |
| 2,182,210 | Osner et al. | Dec. 5, 1939 |